United States Patent Office 3,605,982
Patented Sept. 20, 1971

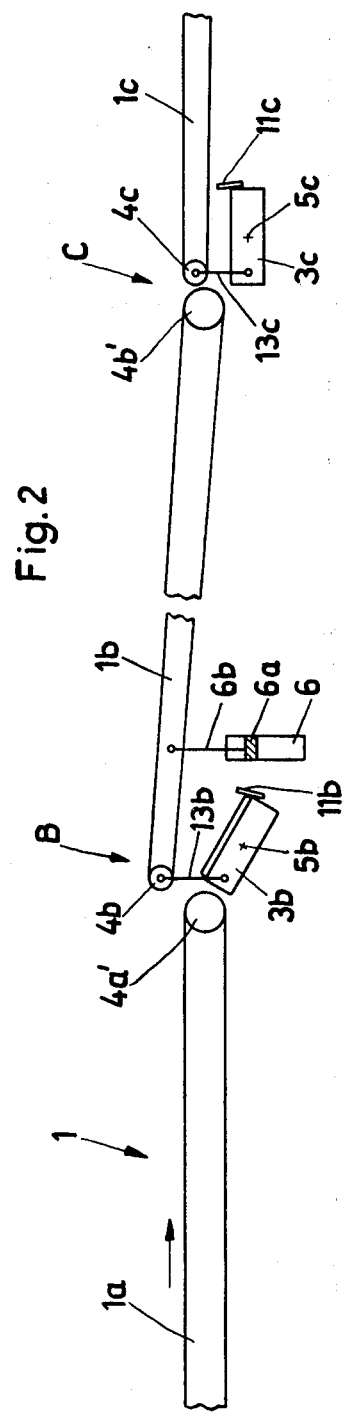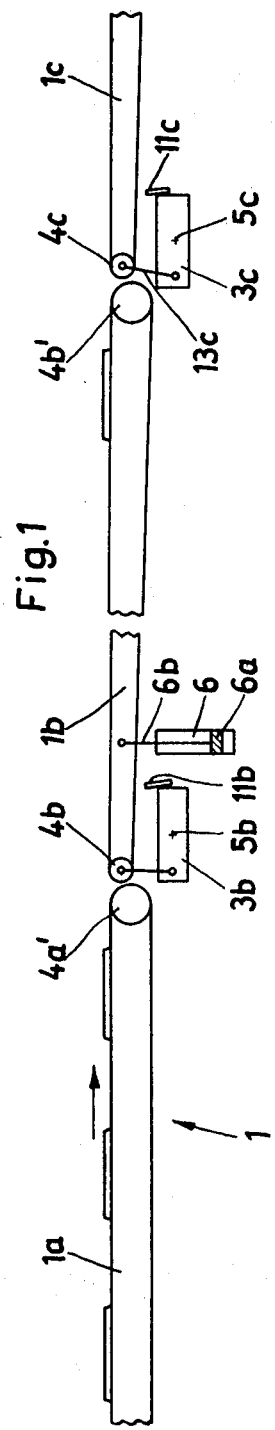

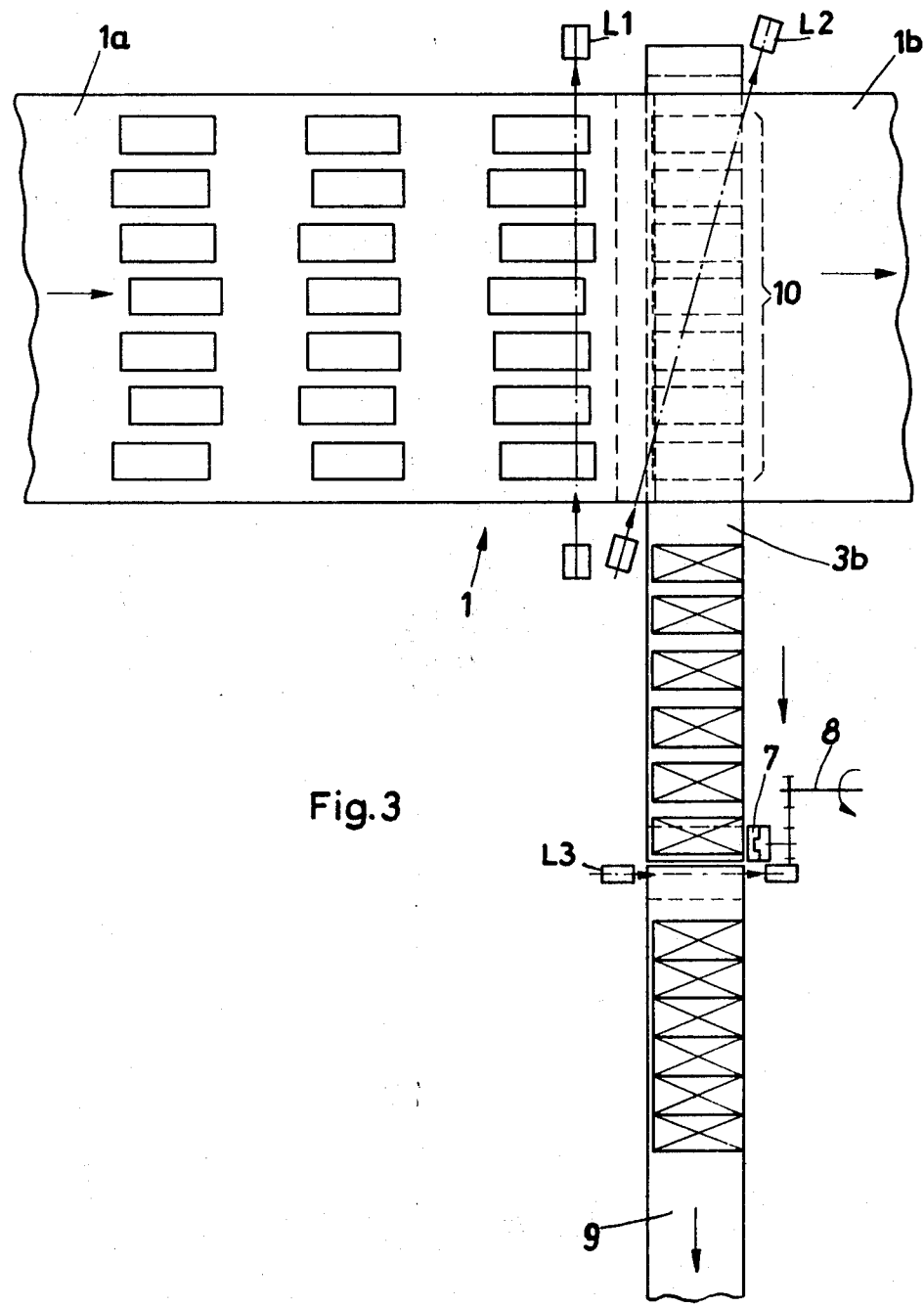

3,605,982
APPARATUS FOR DISTRIBUTING OBJECTS
Michael Adler, Forchheim, Germany, assignor to Maschinenfabrik Loesch GmbH, Forchheim, Germany
Filed Apr. 2, 1970, Ser. No. 24,990
Claims priority, application Germany, Apr. 2, 1969,
P 19 17 062.8
Int. Cl. B65g 47/26
U.S. Cl. 198—30                                11 Claims

ABSTRACT OF THE DISCLOSURE

The invention provides an apparatus for distributing objects, comprising a main conveyor which views objects such as chocolate bars, to be distributed. The main conveyor comprises a plurality of main conveyor sections. The main conveyor sections are in generally horizontal alignments with one another. A plurality of feed conveyors are supported horizontally transversely of the main conveyor adjacent front ends of the associated ones of said main conveyor sections. Means are provided for tilting said feed conveyors about an axis transverse to the main conveyor so that the front edge of said feed conveyors are brought substantially to the level of the preceding main conveyor sections and means are provided for simultaneously pivoting said respective main conveyor sections to bring said front ends of said main conveyor sections out of alignment in the said preceding sections.

---

The present invention relates to an apparatus for distributing objects, such as chocolate bars, arriving on a main conveyor, to a plurality of wrapping machines having associated feed conveyors which lead from and across the main conveyor which comprises individual conveyor sections located one after the other, pivotable distributor devices being provided at distributing stations, located one behind the other.

In a machine for moulding chocolate bars having for example, 40 moulds each adapted to mould 15 bars per minute, a total of 600 bars are moulded per minute. These bars are to be fed to wrapping machines each of which can, for example wrap a miximum of 150 bars per minute. Thus, at least four wrapping machines are required, to which the bars arriving from the moulding machine, have to be distributed.

German patent specification No. 1,238,834 describes a distributor in which an intermediate conveyor is arranged between each main conveyor section, on which the objects arrive, and the following main conveyor section or the feed conveyor on which the objects are to be carried away. The intermediate conveyor extends in the main conveying direction and is in the form of a deflector and is pivotable in such a manner that its end for transferring the objects is adjacent either to the out-going feed conveyor or to the following main conveyor section. Thus, all the incoming objects to be distributed have to pass by way of this deflector and are guided in the desired or open conveying direction by the prevailing position of the deflector.

In this known arrangement, the conveying speed in the region of the intermediate conveyor or of the deflector is about three to four times greater than the speed of the main conveyor, so that the intervals between the individual incoming rows of objects are increased in order to be able to change over the deflector into a fresh position during each interval. The objects are transferred with impetus to the following main conveyor section or to the feed conveyor by this increased conveying speed. Since the incoming objects on the main conveyor are never located accurately in a transverse row but are displaced to a greater or lesser extent in front of or behind this imaginary line, the rows of objects on the intermediate conveyor are separated even further in the conveying direction by the acceleration and, in this separated position, pass onto the following main conveyor section or the feed conveyor. When conveying the rows of objects over a plurality of main conveyor sections, the repeated acceleration can finally separate the objects to the extent where they can no longer be considered to be in rows. Thus, the rows of objects have to be re-aligned on the feed conveyors.

A feature of the invention is to dispense with an intermediate conveyor and its disadvantageous effects and thus to dispense with additional aligning means on the feed conveyors.

In accordance with the invention, there is provided a main conveyor which comprises individual conveyor sections which are arranged one behind the other, virtually at the same level, with distributor devices each being formed by an outgoing feed conveyor and a following main conveyor section associated with a distributing station, the feed conveyor being pivotable out of its horizontal position into a sloping position about an axis extending transversely to the main conveying direction, so that the edge of the feed conveyor adjacent the preceding main conveyor section may be brought to the level of the main conveyor, the beginning of the associated following main conveyor section being simultaneously pivotable from the level of the main conveyor.

Thus, the intermediate conveyor is eliminated and its function is performed by the feed conveyor and the following main conveyor section. The incoming objects are transferred directly from a main conveyor section either to a feed conveyor or to the following main conveyor section. It is no longer necessary to accelerate the objects to load the respective feed conveyors, as the rows are no longer displaced. The omission of the intermediate conveyor enables the main conveyor to be shorter and of simpler construction. The pivoting movement of the feed conveyors and of the main conveyor sections can be initiated so that, after a row of objects has been transferred, the feed conveyor and the main conveyor sections can be pivoted into a fresh position for the next row of objects without difficulty. Thus, despite its high performance, the apparatus constructed in accordance with the invention can be of simple design, and the distributor devices require only such elements which are included in the entire apparatus, namely the main conveyor sections and the feed conveyors for the packing machines.

In a preferred embodiment of the invention, the feed conveyors extend transversely below the respective associated main conveyor sections and are pivotable into a position which slopes downwardly away from the preceding main conveyor section. Thus, the transferring of the objects to the feed conveyor is facilitated by the effect of gravity, the objects simultaneously being aligned into rows.

Advantageously, a stop bar is provided on the edge of the feed conveyor remote from the preceding main conveyor section so that the separate objects slide against this stop bar during transfer and are thereby automatically aligned on the feed conveyor.

Furthermore, it is advantageous in the above-described embodiment if the front end of each following main conveyor section, associated with each distributing station, is pivotable upwardly from the level of the main conveyor. The edge of the feed conveyor adjacent the preceding main conveyor section and located therebelow may then be pivoted upwardly to the level of the main conveyor, the pivoting movements of the main conveyor sections and the feed conveyors being effected in the same direction.

The invention will be further described, by way of example, with reference to the accompanying drawings, in which:

FIG. 1 is a schematic broken away, side elevation, of a main conveyor and feed conveyors shown in a first operating position, FIG. 2 shows the same device illustrated in FIG. 1 but in a second operating position, and FIG. 3 is a plan view of the device illustrated in FIGS. 1 and 2.

With reference to the drawings, objects to be wrapped, such as bars of chocolate made by a moulding machine (not shown), are delivered by a main conveyor 1 which comprises separate main conveyor sections 1a, 1b, 1c, etc. which are arranged one after the other. Feed conveyors 3b, 3c, etc. running transversely of the main conveying direction, extend below the front ends of the main conveyor sections 1b, 1c, etc. The feed conveyors 3b, 3c, etc. lead to wrapping machines (not illustrated) by which the objects, arriving on the main conveyor section 1a of the main conveyor 1, are to be wrapped. The objects to be wrapped, for example, chocolate bars, are delivered by the main conveyor section 1a in the direction of the arrow z in rows which extend transversely of the main conveying direction. As shown in FIG. 3, the individual objects in the rows can be displaced to a greater or lesser extent relatively to each other.

As shown in FIGS. 1 and 2, associated main conveyor sections 1b, 1c, etc. and feed conveyors 3b, 3c, etc. form respective distributing stations which are designated B and C. Further, corresponding distributing stations and associated packing machines (not illustrated) may be provided downstream of the distributing stations B and C.

In its region below the associated main conveyor section 1b, 1c, etc. each feed conveyor 3b, 3c, etc. is pivotable about its longitudinal centre axis 5b, 5c, etc. so that when the feed conveyors are in the horizontal positon their upper runs are located in a plane below the conveying plane of the main conveyor 1, whereas, when the feed conveyors are in a sloping position, their edges (the left hand edges in the drawing), facing each preceding main conveyor section, are raised substantially to the main conveying plane, and the opposite edges of the feed conveyors are correspondingly lowered. The edge of each feed conveyor remote from the preceding main conveyor section has a stop bar 11b, 11c, etc. which extends upwardly along the conveying plane of the feed conveyor.

In the illustrated embodiment, the main conveyor sections 1a, 1b, 1c comprise conveyor belts whose front and rear ends are guided around front and rear guide rollers. Insofar as they are shown in the drawings, FIG. 1 and FIG. 2, the front guide rollers are designated 4b, 4c, and the rear guide rollers are designated 4a', 4b'. The rollers 4b, 4c are smaller than the rollers 4a', 4b', so that each feed conveyor 3b, 3c located below the respective main conveyor sections 1b, 1c may be arranged with its upper run substantially on a level with the bottom run of the preceding main conveyor section, as illustrated in FIG. 1. Thus when the feed conveyors are pivoted, their edges adjacent the preceding main conveyor section may readily be brought to the level of the main conveyor. The separate main conveyor sections 1b, 1c (with the exception of the first main conveyor section 1a) are pivotable in addition to the feed conveyors, namely about the axis of their respective rear guide rollers, for example, the guide roller 4b'. Thus, as may be seen from FIG. 2, the main conveyor section 1b may be pivoted upwardly from the conveying plane of the main conveyor 1 at the distributing station B.

The main conveyor sections are pivoted by adjusting cylinders 6 having adjusting pistons 6a and pistons rods 6b which are attached to the sides of carriers (not illustrated) on the main conveyor sections. The axes of the front guide rollers 4b, 4c of the main conveyor sections 1b, 1c are connected to the supporting structures of the feed conveyors 3b, 3c by respective guide levers 13b, 13c (shown diagrammatically) which are attached to the feed conveyor eccentrically of the axes of rotation 5b, 5c.

In the operating position illustrated in FIG. 1, the main conveyor section 1b is located at the same level as the main conveyor section 1a, and the feed conveyor 3b is located horizontally below the starting position of the main conveyor section 1b. When the adjusting piston 6a is actuated, the main conveyor section 1b is pivoted upwardly about the axis of the roller 4b' as illustrated in FIG. 2, so that the roller 4b is raised above the conveying plane of the main conveyor 1 and the feed conveyor 3b is simultaneously pivoted such that its edge adjacent the main conveyor section 1a is raised to the conveying plane of the main conveyor 1. When the adjusting piston 6a is retracted these movements take place in the reverse sequence.

The drive for the main conveyor sections 1a, 1b, 1c, etc. may be permanently engaged, whereas the feed conveyors are coupled to a drive 8 by way of a clutch 7, as illustrated in FIG. 3 in the case of the feed conveyor 3b. The clutch 7 is disengaged as soon as the adjusting cylinder 6 has brought the main conveyor section 1b and the feed conveyor 3b into a sloping position. The clutch 7 is re-engaged when the conveyor elements are returned to the horizontal position.

Only the portion of the feed conveyor 3b adjacent the main conveyor portion 1b is pivotable about the horizontal axis 5b, whereas the contiguous portion 9 of the feed conveyor, leading to the packing machine, is permanently maintained in a horizontal position and is driven by the wrapping machine.

Various photocells are arranged on the apparatus, a photocell L1 being arranged above the main conveyor portion 1a to detect the incoming rows of objects, and a photocell L2 being arranged horizontally directly above the section 10 of the feed conveyor 3b located below the main conveyor section 1b. The photocell L2 extends obliquely of the conveying direction of the feed conveyor 3b, and, when the feed conveyor 3b is in its horizontal position, scans the feed conveyor 3b for objects. Finally, a third photocell L3 is provided at the beginning of the non-pivotable portion 9 of the feed conveyor 3b and switches off the feed conveyor 3b when objects accumulate on the portion 9.

The method of operation is as follows:

First it will be assumed that the parts of the apparatus are in the operating position illustrated in FIG. 1. When the photocell L1 signals an incoming row of objects, and the photocell L2 signals that the portion 10 of the feed conveyor 3b is free, the latter being in its horizontal position, these signals switch on a pressure medium supply to the adjusting cylinder 6, so that the adjusting piston 6a is lifted. The main conveyor section 1b and the feed conveyor 3b are thereby pivoted into their sloping positions. The clutch 7 is simultaneously disengaged, so that the feed conveyor 3b is stopped. The row of objects signalled by the photocell L1 is thus transferred to the feed conveyor 3b and the individual objects are aligned against the stop bar 11b. The objects cannot be displaced from their parallel positions relative to each other, since the feed conveyor 3b is stationary.

The switching arrangement is such that the adjusting piston 6a is returned to its bottom position after a row of objects has been transferred to the feed conveyor 3b, the main conveyor section 1b and the feed conveyor 3b being pivoted back into their horizontal positions, whereupon the clutch 7 is re-engaged. The objects located on the feed conveyor 3b are now fed to the wrapping machine (not illustrated) by way of the portion 9 of the feed conveyor 3b.

Provided the objects on the feed conveyor 3b are still located in the region of the photocell L2, the latter prevents the feed conveyor 3b from being pivoted upwardly, so that the feed conveyor 3b remains in its horizontal position and following rows of objects are transferred from the main conveyor section 1a to the following main conveyor section 1b from which they are transferred either to the second feed conveyor 3c or to the following main conveyor section 1c. As soon as the photocell L2 signals that the section 10 of the feed conveyor 3b is again free, the next row of objects is transferred to the feed conveyor 3b.

When the wrapping machine is operating in the normal trouble-free manner, the photocell L3 scans only the gaps between the objects following each other on the feed conveyor 3b and does not effect any control function. The portion 9 of the feed conveyor 3b is stopped for example if the output of the wrapping machine drops or if the wrapping machine stops as the result of a fault. The objects following from the feed conveyor 3b are then arrested in the region of the photocell L3. The clutch 7 is disengaged by the prolonged interruption of the light beam directed onto the photocell L3 and remains disengaged until the photocell L3 signals "free" again. No further objects are conveyed from the region 10 as long as the clutch 7 is disengaged, so that the photocell L2 permanently signals "occupied," thus stopping the supply of objects to the feed conveyor 3b, so that the following rows of objects are transferred to the following main conveyor section 1b at the distributing station B.

I claim:

1. An apparatus for distributing objects comprising a main conveyor for the objects to be distributed, said main conveyor comprising a plurality of main conveyor sections, means supporting said main conveyor sections in generally horizontal alignment, a plurality of feed conveyors for the distributed objects, means supporting said feed conveyors horizontally transversely of the main conveyor adjacent front ends of respective ones of said main conveyor sections, drive means for the main conveyor, drive means for each of said feed conveyors, means for tilting said feed conveyors out of the horizontal into a sloping position about an axis transverse to the main conveyor to bring an edge of said feed conveyor adjacent the main conveyor section immediately preceding said respective main conveyor section substantially to the level of said preceding section, and means for simultaneously pivoting said respective main conveyor sections to bring said front ends thereof out of alignment with said preceding sections.

2. An apparatus according to claim 1, in which said feed conveyors for the distributed objects extend transversely below the front ends of the respective ones of said main conveyor sections and are tiltable into a position wherein they slope downwardly away from the preceding main conveyor sections.

3. An apparatus according to claim 2, in which the tiltable axes of said feed conveyors are the central longitudinal axes of said feed conveyors.

4. An apparatus according to claim 2, in which a stop bar is arranged at the edge of each feed conveyor remote from the preceding main conveyor section.

5. An apparatus according to claim 2, in which the front end of each of said respective main conveyor sections is pivotable upwardly from the level of the preceding main conveyor section.

6. An apparatus according to claim 5, in which the pivotal axis of each main conveyor section is located at the discharge end thereof.

7. An apparatus according to claim 2, in which each feed conveyor and its respective main conveyor section are coupled to each other for common movement and are simultaneously adjustable by a common adjusting device.

8. An apparatus according to claim 2, comprising control means interrelating said drive means for said feed conveyors with said tilting means therefor for stopping said feed conveyors when they are in a sloping position.

9. An apparatus according to claim 8, comprising a photocell arranged above said preceding main conveyor sections to detect the incoming rows of objects.

10. An apparatus according to claim 8, comprising a photocell extending obliquely of the front end of the conveying direction of said feed conveyor and scanning said feed conveyor when in a horizontal position.

11. An apparatus according to claim 8, comprising a photocell arranged at each feed conveyor and operating to prevent the feed conveyor from tilting into its sloping position when objects accumulate on this feed conveyor, thus preventing the transferring of further objects onto this conveyor.

References Cited

FOREIGN PATENTS 1,399,809  4/1965  France _____ 198—30

EDWARD A. SROKA, Primary Examiner

U.S. Cl. X.R.

198—78